United States Patent [19]

Salzmann et al.

[11] Patent Number: 5,795,531
[45] Date of Patent: Aug. 18, 1998

[54] METHOD AND APPARATUS FOR THE CROSS-SECTIONAL MEASUREMENT OF ELECTRIC INSULATED CONDUCTORS

[75] Inventors: Hannes Salzmann, Greppen; Ulrich Jung, Fehraltorf; Wilfried Kötter, Attinghausen, all of Switzerland

[73] Assignee: Zumbach Electronic AG, Switzerland

[21] Appl. No.: 534,021

[22] Filed: Sep. 26, 1995

Related U.S. Application Data

[63] Continuation-in-part of Ser. No. 260,166, Jun. 15, 1994, Pat. No. 5,578,681, which is a continuation of Ser. No. 865,398, Apr. 8, 1992, abandoned.

[30] Foreign Application Priority Data

Apr. 9, 1991 [CH] Switzerland .................... 1053/91

[51] Int. Cl.$^6$ .................... B29C 47/06; B29C 47/92
[52] U.S. Cl. .................. 264/408; 264/473; 264/488; 264/171.15; 264/171.17; 264/173.12; 264/174.11; 425/114; 425/141; 378/54
[58] Field of Search .................... 264/405, 406, 264/408, 488, 473, 171.15, 171.17, 173.12, 174.11; 425/113, 114, 141, 174.4; 378/54, 58; 250/369

[56] References Cited

U.S. PATENT DOCUMENTS

| | | |
|---|---|---|
| 2,922,887 | 1/1960 | Jacobs . |
| 3,080,479 | 3/1963 | Berg et al. . |
| 3,187,071 | 6/1965 | Radziejowski . |
| 3,479,446 | 11/1969 | Arnaudin, Jr. et al. . |
| 3,502,752 | 3/1970 | Brown . |
| 3,609,368 | 9/1971 | Knorr et al. . |
| 3,796,874 | 3/1974 | Roller et al. . |
| 4,086,044 | 4/1978 | Sikora .................... 264/408 |
| 4,137,028 | 1/1979 | Reitemeyer et al. . |
| 4,259,281 | 3/1981 | Lanfranconi et al. . |
| 4,585,407 | 4/1986 | Silver et al. . |
| 4,590,658 | 5/1986 | Funyu et al. . |
| 4,605,525 | 8/1986 | Baxter . |
| 4,708,837 | 11/1987 | Baxter et al. . |
| 4,710,114 | 12/1987 | Garner . |
| 4,719,061 | 1/1988 | Duffy . |
| 4,732,722 | 3/1988 | Aida et al. . |
| 4,997,995 | 3/1991 | Simmons et al. . |
| 5,138,644 | 8/1992 | McArdle et al. . |
| 5,518,681 | 5/1996 | Salzmann et al. .................... 264/408 |

FOREIGN PATENT DOCUMENTS

| | | |
|---|---|---|
| 0400310 | 12/1990 | European Pat. Off. . |
| 2402480C3 | 7/1975 | Germany . |
| 2634183A1 | 2/1978 | Germany . |
| 2746837 | 4/1979 | Germany . |
| 3123685A1 | 3/1982 | Germany . |
| 4204205 | 7/1992 | Japan . |
| 2132343 | 7/1984 | United Kingdom . |
| 2145852 | 4/1985 | United Kingdom . |

OTHER PUBLICATIONS

K. Klebl et al., "Einsparung von Kabelisoliermaterialien: Optimale Wanddicke von Kabeln und Leitungen", DRAHTWELT 1 –1977 (Brief Synopsis).

*Primary Examiner*—Mathieu D. Vargot
*Attorney, Agent, or Firm*—Dilworth & Barrese

[57] ABSTRACT

A method and an apparatus for an exact measurement of the thickness of a plurality of individual semi-conductor and insulation layers and the determination of the centricity/eccentricity of a medium-voltage and/or high-voltage insulated conductor. The individual semi-conductor and insulation layers of the insulated conductor emerging from an extrusion device are penetrated with X-rays in at least two directions laying within a plane orthogonal to the axis of the insulated conductor. On carrying out a line-scan intensity detection of the X-rays having penetrated the insulated conductor, the thickness of the individual layers as well as the position of the conductor is computed. These values are compared with target ones, and, if necessary, the position of the extruder heads can be corrected accordingly.

13 Claims, 2 Drawing Sheets

METHOD AND APPARATUS FOR THE CROSS-SECTIONAL MEASUREMENT OF ELECTRIC INSULATED CONDUCTORS

CROSS-REFERENCE TO RELATED APPLICATIONS

This application is a continuation-in-part of U.S. appln. Ser. No. 08/260,166, filed Jun. 15, 1994, now U.S. Pat. No. 5,518,881 which is a continuation of U.S. appln. Ser. No. 07/865,398, filed Apr. 8, 1992, now abandoned.

BACKGROUND OF THE INVENTION

1. Field of the Invention

The invention relates to a method of measuring the cross-section of an insulated electrical conductor, in particular a medium-voltage and/or high-voltage insulated conductor, as well as to an apparatus for carrying out the method. Using this method/apparatus, the spatial arrangement and dimensions of individual layers, such as an inner semi-conductor, an insulation, and an outer semi-conductor, as applied onto a copper conductor are recorded in order to monitor the adjustment of the extruder heads of an extrusion device, which is equipped with appropriate tools and serves also to cross link the individual layers and the conductor in an appropriate installation.

2. Discussion of the Prior Art

EP-A 0 400 310 discloses an apparatus for controlling the outside diameter of an insulated conductor, in which apparatus the outside diameter of the plastic strand emerging from the extruder is measured by means of a first measuring device immediately following the extruder and by a second measuring device following a cooling section and the actual diameter determined this way of measuring is compared with the target diameter. A signal is formed from the difference values and this signal is used for controlling the speed of the extruder or for controlling the take-off rate of the plastics strand emerging from the extruder. With the known apparatus, only the outer diameter is measured and, in the event of any deviations, the extruder corrected correspondingly.

EP-A 0 387 508 discloses an apparatus for vulcanizing or cross-linking an insulated conductor strand, which apparatus essentially comprises a tubular body which is equipped with an inspection glass fitting and essentially forms the heating and cooling zone.

Roller et al. (U.S. Pat. No. 3,796,874) disclose a non-destructive eccentricity and insulation thickness measurement system based on one-directional X-ray imaging. This reference discloses an apparatus comprising a linear focal spot X-ray source with a source area of 0.2 by 8 mm which has to be fixed at a distance of 381 mm from the cable to be irradiated. While irradiating the cable permanently, on the side of the cable where the transmitted X-rays leave, and in a plane parallel to the cable axis, a scanning slit is moved across the cable in an essentially orthogonal direction to the cable axis. Thus a detector is exposed to the X-rays recording their intensity with respect to the cross-section of the penetrated cable. The slit width determines the resolution to about 0.5 mm. Despite or because of the simple lay out of the apparatus, on the one hand the detected signal has to be amplified 3 times and filtered twice because of the relatively poor signal/noise ratio, and, on the other hand, complex calculations have to be carried out in order to correct the data for geometric errors and to compensate for the speed error of the slit which is not moving with a constant relative speed. Thus, the method and apparatus can only be applied to insulated conductors having only a single insulation layer and a total thickness of 76.2 mm.

With current requirements for such insulated conductors, but in particular in the case of medium-voltage and high-voltage insulated conductors having a plurality of insulation or semi-conductor layers surrounding a copper conductor, it is necessary that, on the one hand, the copper conductor is arranged centrally, and, on the other hand, the individual insulation or semi-conductor layers have minimum possible difference in thickness over the circumference of the insulated conductor, i.e. that the individual layers are evenly distributed on the finished insulated conductor.

In order to measure the dimensions of a plurality of individual insulation or semi-conductor layers present in a medium-voltage or high-voltage conductor without destruction of the cable, advanced technology is required as the density and composition of said individual layers can be very similar and therefore said individual layers are not easily distinguished.

SUMMARY OF THE INVENTION

The invention is therefore based on the object of providing a method and an apparatus for carrying out the method by which an exact measurement of the thickness of a plurality of individual semi-conductor and insulation layers and the determination of the centricity/eccentricity of the insulated conductor can be carried out.

This object is achieved by the method according to the invention in that the individual semi-conductor and insulation layers of the insulated conductor emerging from the extrusion device are penetrated with rays in at least two directions laying within a plane orthogonal to the axis of the insulated conductor. On carrying out a line-scan intensity detection of the rays having penetrated the insulated conductor, the thickness of the individual layers as well as the position of the conductor is computed. These values are compared with target ones, and, if necessary, the position of the extruder heads can be corrected accordingly.

By the method according to this invention, in addition to the intensity values determined, undesired inhomogeneities of the irradiated layers can also be detected, so that at the same time optimal quality control can also be achieved thereby.

The apparatus for carrying out the method comprises an extrusion device, an assigned cross-linking device, and at least one measuring device placed there between and at least one measuring device placed thereafter. The extruder device comprises at least one extruder head, which is provided with adjustable tools. A first measuring device is fitted to the extrusion device, immediately downstream with respect to the out-put direction of the extruder. By means of the said measuring device, an insulated conductor, comprising at least one conductor (e.g. from aluminum or copper), an inner semi-conductor, an insulation, and an outer semi-conductor, which all are to be cross linked in said cross-linking device, is measured by irradiating the entire cable cross-section in order to determine the individual layer thicknesses. After having passed the cross-linking device, the cable is scanned a second time by a second measuring device in order to determine the centricity/eccentricity of the insulated conductor. If the values determined by the second measuring device differ from the preset values, corrections of the extruder head position can be carried out using the tools.

Further features of the invention emerge from the following description in conjunction with the drawings and the claims.

BRIEF DESCRIPTION OF THE DRAWINGS

The invention is described below with reference to the drawings, in which.

DESCRIPTION OF THE PREFERRED EMBODIMENTS

Figure 1:
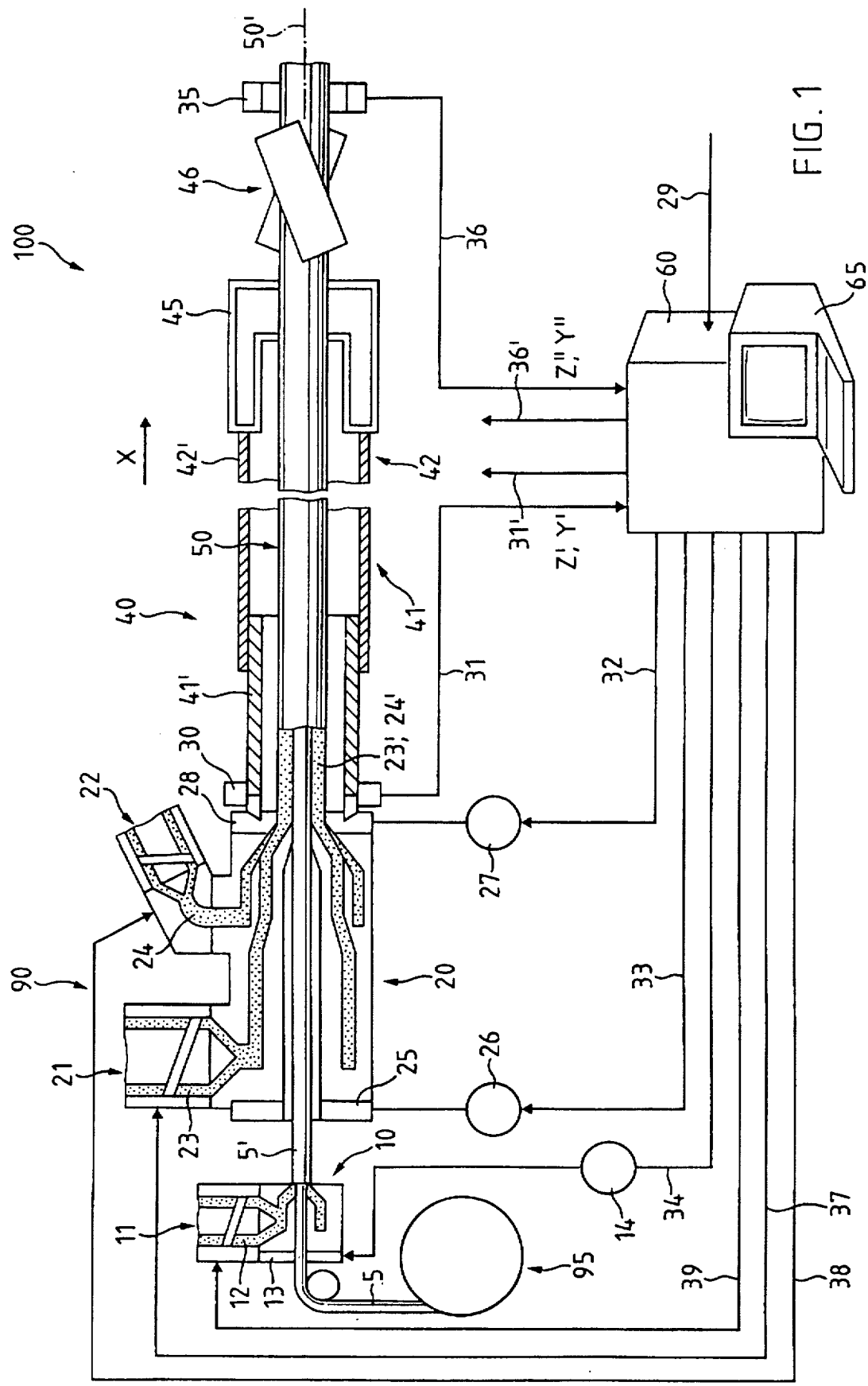
FIG. 1 shows a part, represented as a block diagram, of an installation for producing medium-voltage and/or high voltage insulated conductors.

FIG. 1 shows a diagrammatically represented installation 100 for producing insulated conductors, in particular for producing medium-voltage and/or high-voltage insulated conductors (i.e. XLPE type). Such installation are known per se as so-called "continuous vulcanization" installations (CV installations).

The installation 100, represented as an exemplary embodiment, essentially comprises an unwinding station 95, a single extruder head 10 and a double extruder head 20, a so-called cross-linking section 40 with appropriately assigned tube-end sealing device 45, a twisting caterpillar 46, and a winding station (not shown). The extruder heads 10, 20 together form an extrusion device 90, it being possible however, for the two extruder heads 10 and 20 to be designed as one unit, i.e. as a triple or multiple extruder head.

In the installation 100, a copper conductor 5 is drawn off from the unwinding station 95 by means of appropriately arranged and designed deflecting stations (not shown) and fed to the first extruder head 10 by means which are not shown.

The diagrammatically represented first extruder head 10 comprises a first extruder, denoted by 11, which is in effective connection with an appropriately assigned centering device 13 and is designed for applying inner semi-conductor granules 12 to the copper conductor 5. When it leaves the first extruder head 10, the copper conductor 5', provided with the inner semi-conductor 2 (FIG. 3), is fed to the double extruder head 20.

The double extruder head 20 comprises a second extruder 21, which is in effective connection with an appropriately assigned centering device 25 and is designed for applying insulation granules 23 to the copper conductor 5' provided with the inner semi-conductor 2.

Subsequently or at the same time, appropriate outer semi-conductor granules 24 are applied to the copper conductor 5', provided with the insulation granules 23, by an appropriately assigned third extruder 22 of the double extruder head 20. The third extruder 22 is effectively connected to an appropriately assigned centering device 28.

For adjusting and controlling the centering to be performed for the application of the corresponding granules, the centering device 13 of the first extruder head 10 is in effective connection with a servo motor 14 and the centering device 25 of the double extruder head 20 is in effective connection with a servo motor 26 and the centering device 28 is in effective connection with the servo motor 27.

The insulated conductor 50, provided with the individual layers and emerging from the double extruder head 20 of the extrusion device 90 is in this case measured with respect to its cross-section by means of an appropriately arranged first measuring device 30, revealing the individual layer thicknesses and is subsequently passed through the cross-linking section, denoted overall by 40.

Figure 2:
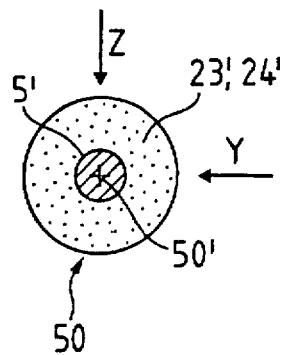
FIG. 2 shows an insulated conductor, represented diagrammatically and in profile cross-section, to explain the irradiation directions Z and Y laying in a plane orthogonal to the cable axis.

In FIG. 1 and FIG. 2, the insulation and semi-conductor granules applied to the copper conductor 5' upstream of the cross-linking section 40 are denoted by 23' and 24'.

The cross-linking section 40, known per se and diagrammatically represented, essentially comprises a first tubular body 41' and a second tubular body 42', seen in the production and out-put direction X. Arranged on the tubular body 42' on the side opposite to the extruder device 20 is the tube-end sealing device 45.

The two tubular bodies 41', 42' are telescopically connected to each other, there essentially being arranged in the tubular body 42' a heating section, denoted overall by 41, and a cooling section, denoted overall by 42. A thermally activated cross-linkage, i.e. a chemical bonding of the molecular chains of the insulation material and also of the semi-conductor materials, takes place in the heating section 41 at about the order of 200° C. The insulated conductor 50 is appropriately cooled in the cooling section 42.

For technical reasons, pressurized nitrogen gas or steam is introduced into the tubular bodies 41', 42', sealed off at both ends, the pressure prevailing in the tubular bodies 41', 42' preferably being of the order of 10 to 15 bar.

By means of appropriately assigned twisting caterpillar 46, for technical production reasons the insulated conductor 50 is twisted in a way known per se essentially over the entire length of the cross-linking section 40.

The insulated conductor 50 emerging from the cross-linking section subsequently runs through a second measuring device 35, by means of which any eccentricity of the insulated conductor 50 is determined.

The measuring device 30, diagrammatically represented in FIG. 1, is essentially based on the X-ray technique known per se and is preferably adjustable and fixable within a plane orthogonal and in directions parallel to the axis of the insulated conductor 50 by means which are not shown.

The measuring device 30 is designed in such a way that at least one X-ray beam, preferably a focussed X-ray beam, is directed orthogonal to the insulated conductor axis 50'. The actual measuring device 30 can also be displaced within the same plane orthogonal to the insulated conductor axis 50', as a result of which optimal irradiation through the individual layers with respect to the cross-section is achieved.

As shown in FIG. 2, in the case of a preferred design, two focussed X-ray beams are directed, within a plane preferably orthogonal to the insulated conductor 50', from two individual emitting sources (not shown) of the measuring device 30, in the directions of the arrows X or Y respectively. Preferably, the direction X is orthogonal to the direction Y. The X-rays passed through the insulated conductor 50 in X or Y direction are measured by two individual appropriately assigned detector devices (not shown) installed in opposition to the X-ray sources so that the insulated conductor 50 lays between the said X-ray sources and the respective detectors.

In order to measure an entire cross-section of the insulated conductor 50, the measuring device 30 preferably comprises two essentially U-shaped measuring units 70. In order to have a clear readability in FIG. 2, only one measuring unit 70, moveable in the scanning direction 73, is presented, comprising on one side an X-ray source 71 and on the opposite side an X-ray detector 72. The two measuring units 70 are moved in a plane orthogonal to the insulated conductor axis 50' and in a scanning direction 73, orthogonal to a direction Z (presented measuring unit 70) or Y respectively (measuring unit not shown). By a different attachment of the measuring device 30 to the tubular body 41', any scan direction in the said plane orthogonal to the insulated conductor can be chosen.

In FIG. 1, intensity values Z' and Y', referred to the correspondingly detected signals, are fed from the first measuring device 30 via a line 31 to a computer 60 and are processed to reveal the individual layer thicknesses. Intensity values Z" and Y", referred to the correspondingly detected signals, are fed from the second measuring device 35 via a line 36 to a computer 60 and are processed to reveal the centricity/eccentricity of the conductor and the layers. The data can be displayed for example on a monitor 65. The first measuring device 30 is appropriately activated by a computer 60 via a line 31' and the second measuring device 35 is appropriately activated by a computer 60 via line 36'.

By means of a suitable computer program, the actual values measured according to the invention can be compared with the preset values regarding the individual layer thicknesses and centricity of the insulated conductor 50. If necessary, correction of the adjustable tools provided in the extruder heads 10, 20 can be carried out by feeding correction values via line 32 to the servo motor 27, in effective connection with centering device 28, and/or via line 33 to the servo motor 26, in effective connection with the centering device 25, and/or via line 34 to the servo motor 14, in effective connection with centering device 13.

Appropriate data are fed via line 29 to the computer 60 in order to control the entire installation 100. For speed control, appropriate set-value signals are fed from the computer 60 via a line 39 to the extruder 11, via a line 37 to the extruder 21, and via a line 38 to the extruder 22.

Figure 3:
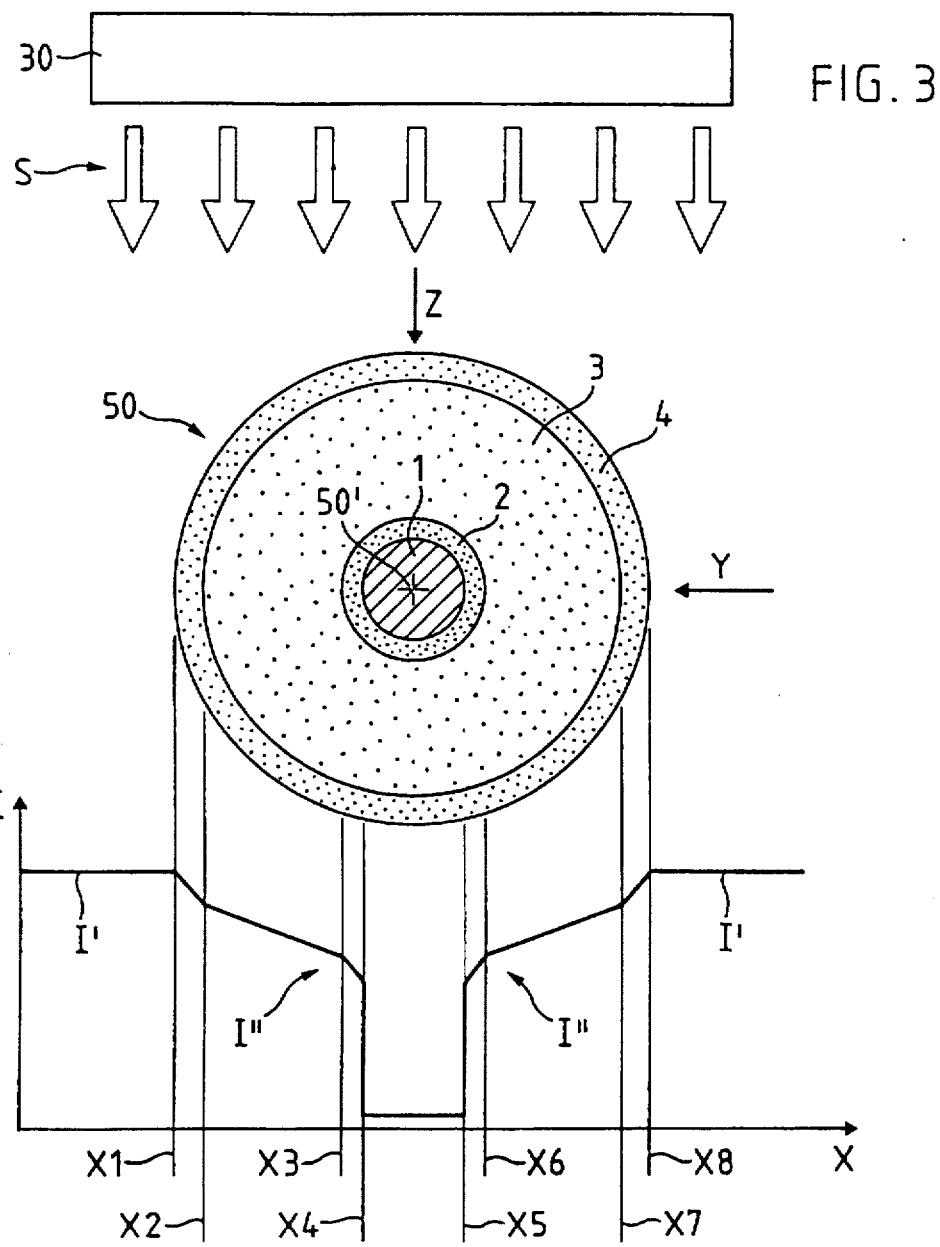
FIG. 3 shows an insulated conductor, represented on an enlarged scale and in profile cross-section. A graphic representation of intensity values of the rays having penetrated a cable is displayed after line-scan detection and recording, corresponding to the cross-section.
Figure 2:
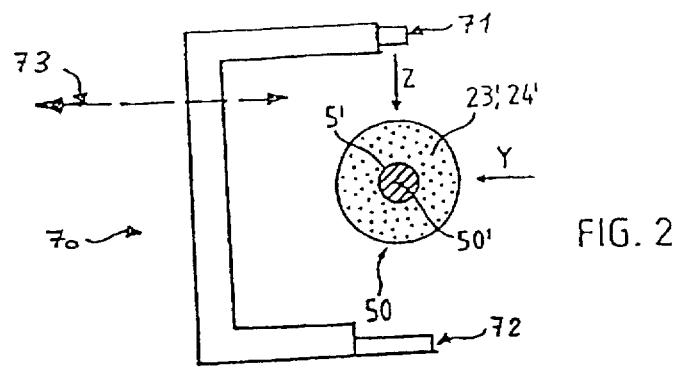
Figure 3:
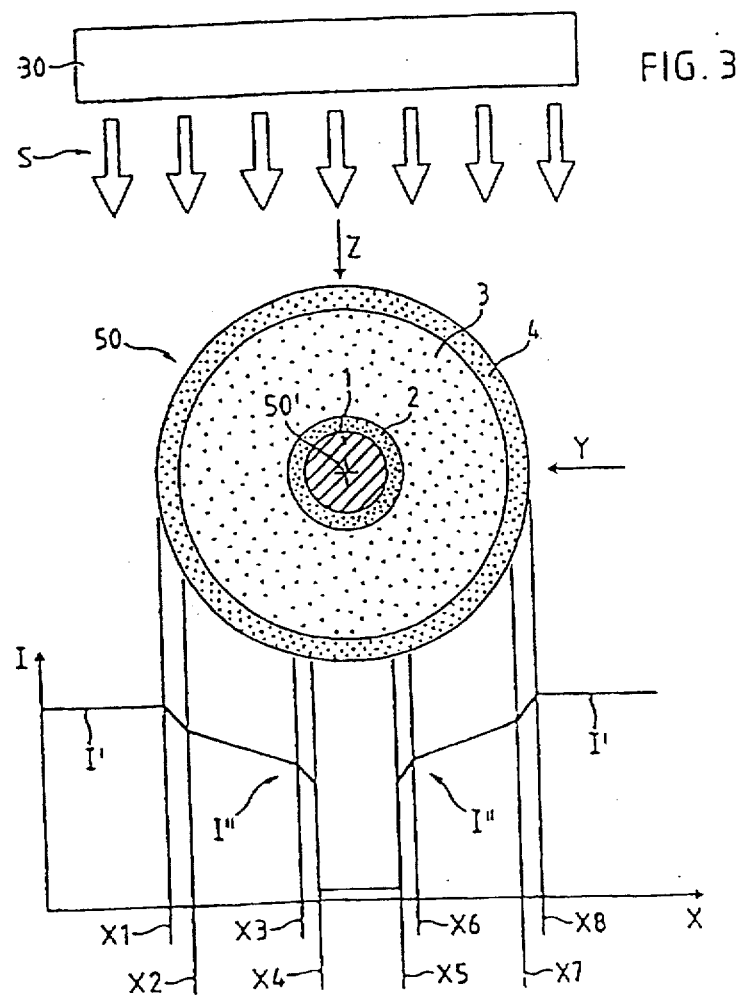

FIG. 3 shows, on an enlarged scale and in profile cross-section, an insulated conductor 50 (i.e. XLPE type), essentially comprising the copper conductor 1, the inner semi-conductor 2, the insulation 3 and the outer semi-conductor 4, with a further, diagrammatically represented, embodiment of the measuring device 30 according to the invention. In the exemplary embodiment represented, a number of beams S, which are directed in the direction of arrow Z, in a plane orthogonal to the direction of the insulated conductor axis 50' and correspondingly penetrate the individual semi-conductor and insulation layers 2, 3, and 4 of the insulated conductor 50, are emitted by the measuring device 30, provided with a detector device (not shown) placed on the opposite side of the irradiated insulated conductor 50.

In the graphic representation, an X-ray intensity is denoted by the coordinate I and the linear position orthogonal to the insulated conductor axis 50' is denoted by the coordinate X. The magnitude of the primary X-ray intensity (before or not penetrating the insulated conductor 50), as emitted by the X-ray source of the measuring device 30 and recorded with an X-ray detector, is denoted by I'. The magnitude of the X-ray intensity (after penetrating the insulated conductor 50), reduced by the interaction with the respective semi-conductor and insulation layers and recorded with an X-ray detector, is denoted by I".

On the coordinate X, the linear positions of the X-ray intensity changes, recorded at the outer or inner borders of the penetrated individual semi-conductor and insulation layers 2, 3, and 4 as well as the copper conductor 1 are specified by X1, X2, X3, X4, X5, X6, X7, and X8.

At this point, it is stated that the irradiation and complete penetration of an insulated conductor 50 in a plane orthogonal to the insulated conductor axis 50' can be performed in such a way as to reveal a complete cross-section view including all points present on the respective circumference of the insulated conductor 50, as represented in FIG. 3 by the arrows Z and Y. Complete penetration may be performed with focussed and/or with fanned beams, it being possible for detection of the beam intensities to take place at a point, on a line or else on a surface.

Irradiation and penetration by means of an appropriately designed X-ray emitting and detecting system (X-ray device) is a preferred application, it likewise being possible for other beam systems and beam sources to be used.

What is claimed is:

1. A method of measuring the entire cross-section of a medium-voltage and/or high-voltage insulated conductor which includes at least an inner semi-conductor layer, an insulation layer, and an outer semi-conductor layer applied to a conductor emerging from an extrusion device, said extrusion device being equipped with adjustment tools, said insulated conductor being cross-linked within a cross-linking device following emergence from said extrusion device;

the method comprising the steps of:
penetrating the semi-conductor and insulation layers of the insulated conductor emerging from the extrusion device by passing at least two differently directed, individual X-ray beams entirely across said insulated conductor within a plane orthogonal to the insulated conductor axis, such that each X-ray source is simultaneously moved with its respective detector;
determining the X-ray intensity line-scan values of each beam; and
computing the intensity values to determine the actual thicknesses of the individual semi-conductor and insulation layers.

2. The method according to claim 1, further comprising the step of correcting the position of said adjustment tools within the extrusion device, the correcting step comprising:
comparing the actual thicknesses with target thicknesses of the individual semi-conductor and insulation layers to determine the difference in the thicknesses;
correcting the individual layer thicknesses to substantially eliminate the differences by adjusting said tools of said extrusion device.

3. The method according to claim 1, wherein said penetrating step provides a first measuring device, capable of being displaced in a plane orthogonal to the insulated conductor axis, and orthogonal with respect to the beam directions, such that said first measuring device emits X-rays which penetrate all individual layers of an entire insulated conductor.

4. The method according to claim 3, wherein said penetrating step provides at least two focused beams which penetrate the cross-section of the insulated conductor.

5. The method according to claim 3, wherein said penetrating step provides at least two fanned beams which penetrate the cross-section of the insulated conductor.

6. The method according to claim 1, wherein said penetrating step provides said two beams to penetrate the cross-section of the insulated conductor in a direction orthogonal with respect to each other.

7. The method according to claim 6, wherein the beams are generated by an X-ray system to scan the cross-section of the insulated conductor.

8. The method according to claim 2, wherein the beams scan the cross-section of the insulated conductor, firstly in the forward direction immediately downstream of the extrusion device to measure its individual layer thicknesses and secondly, after the insulated conductor passes the cross-linking device for thermal cross-linking to evaluate the centricity/eccentricity of the insulated conductor.

9. The method according to claim 8, wherein the correcting step adjusts the tools within the extrusion device by determining the intensity values as a function of the individual layer thicknesses and with respect to the centricity/eccentricity of the insulated conductor.

10. The method according to claim 9, wherein the intensity values depending on the layer thicknesses of the semi-conductors and of the insulation and the values depending on the centricity/eccentricity of the insulated conductor are compared arithmetically with the corresponding target values, the differences being used to determine the amount of adjustment to said tools within the extruder device.

11. The method according to claim 10, wherein the extrusion device is controlled by a computer.

12. An apparatus for measuring the entire cross-section of a medium voltage and/or high voltage insulated conductor, said apparatus being attached to an extrusion device having at least one extruder head and being equipped with adjustable tools for producing said insulated conductor which includes at least one conductor, an inner semi-conductor layer, an insulation layer, and an outer semi-conductor layer, said extrusion device further including a cross-linking device associated with said extrusion device for thermal cross-linking all individual layers of the insulated conductor, the improvement which comprises:

a first measuring device attached in the forward direction immediately following said extrusion device, said first measuring device including at least two displaceable parts for penetrating the semi-conductor and insulation layers of the insulated conductor emerging from the extrusion device with at least two differently directed, focused or fanned X-ray beams;

the moving direction of said displaceable parts of said first measuring device points along the entire cross-section of said insulated conductor within a plane orthogonal to the insulated conductor axis, such that each beam source may be simultaneously movable with its detector; and a computer for processing ascertained sets of X-ray intensity line-scan values to reveal actual thicknesses of the semi-conductor layers and of the insulation layer.

13. Apparatus according to claim 12, further comprising a second measuring device, arranged a distance from the first measuring device and downstream of the cross-linking device with respect to the forwarding direction for determinating the centricity/eccentricity of the insulated conductor.

* * * * *

UNITED STATES PATENT AND TRADEMARK OFFICE
CERTIFICATE OF CORRECTION

PATENT NO. : 5,795,531
DATED : August 18, 1998
INVENTOR(S) : Hannes Salzmann et al.

It is certified that error appears in the above-identified patent and that said Letters Patent is hereby corrected as shown below:

Drawings,
Delete Fig. 2, and substitute therefore Fig. 2, as shown on the attached page.

Signed and Sealed this

Eighth Day of January, 2002

Attest:

JAMES E. ROGAN
*Attesting Officer*     *Director of the United States Patent and Trademark Office*

UNITED STATES PATENT AND TRADEMARK OFFICE
CERTIFICATE OF CORRECTION

PATENT NO. : 5,795,531
DATED : August 18, 1998
INVENTOR(S) : Hannes Salzmann et al.

It is certified that error appears in the above-identified patent and that said Letters Patent is hereby corrected as shown below:

<u>Title page,</u>
Item [63], References Cited, Patent No. "5,578,681" should be -- 5,518,681 --.

Signed and Sealed this

Thirtieth Day of July, 2002

*Attest:*

JAMES E. ROGAN
*Attesting Officer*   *Director of the United States Patent and Trademark Office*